April 21, 1925.  1,534,791
H. KUNDIG
HYDRAULIC STEERING GEAR
Filed Nov. 22, 1921   6 Sheets-Sheet 1
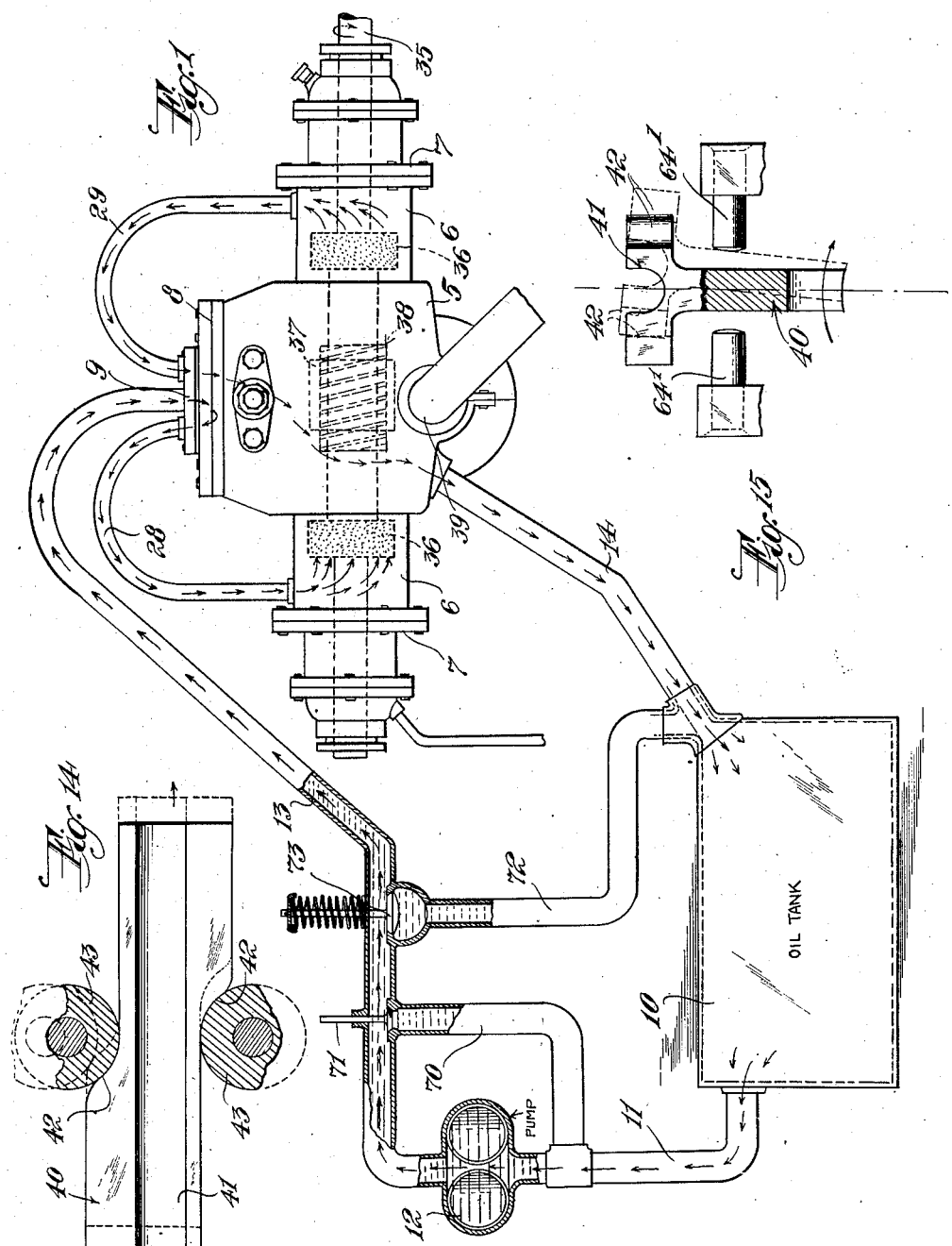

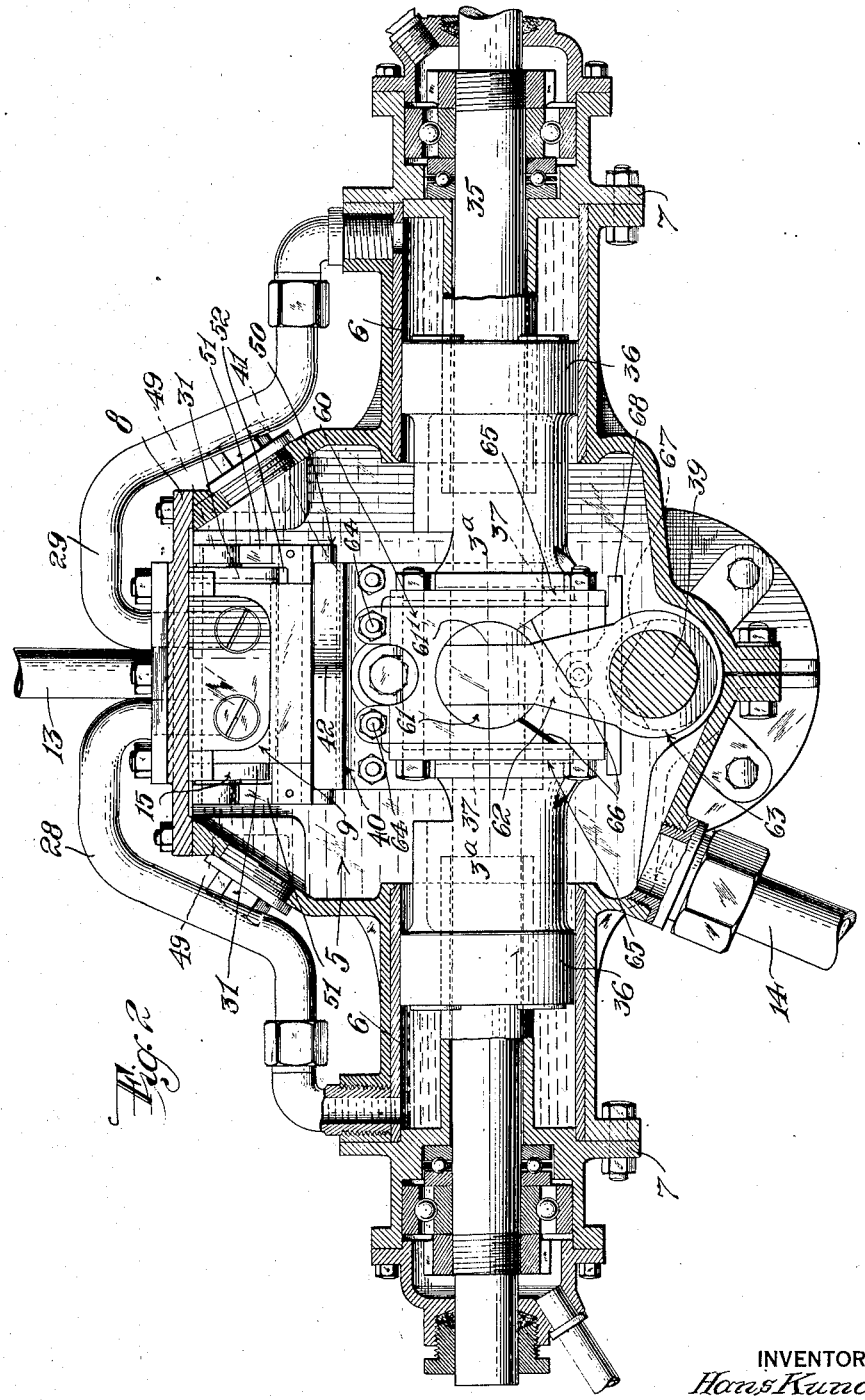

April 21, 1925.
H. KUNDIG
1,534,791
HYDRAULIC STEERING GEAR
Filed Nov. 22, 1921
6 Sheets-Sheet 3
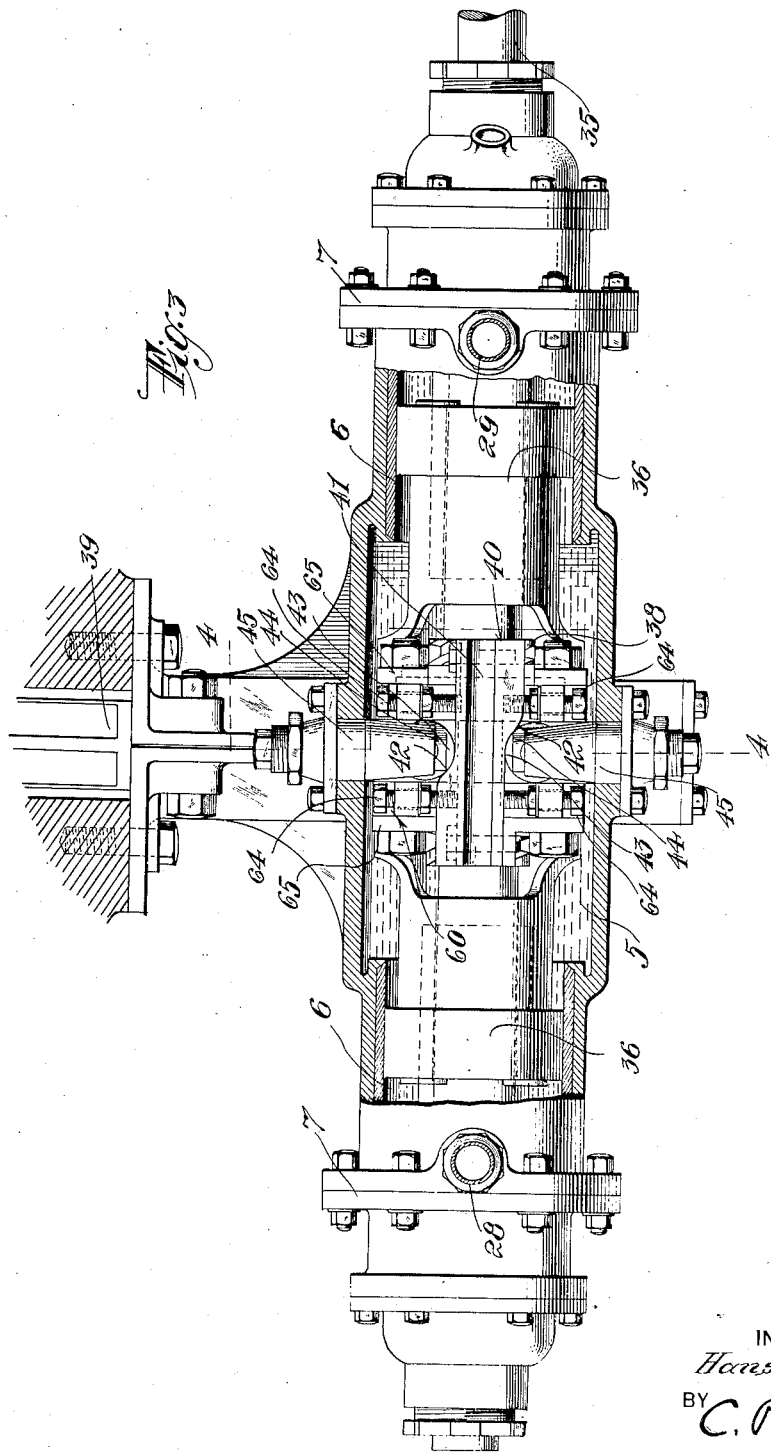
INVENTOR
Hans Kundig
BY
C. P. Goepel
ATTORNEY

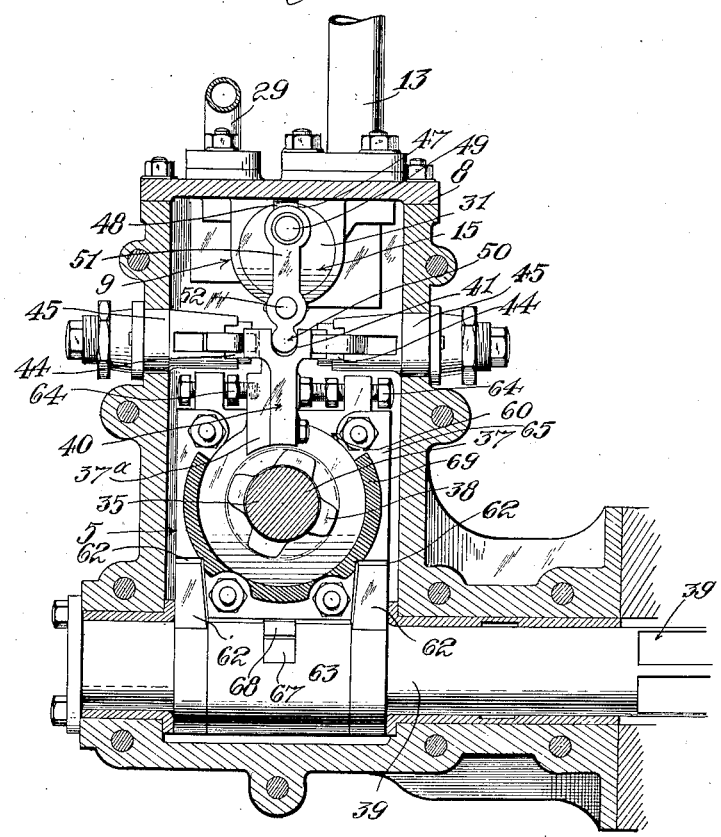

April 21, 1925.
H. KUNDIG
HYDRAULIC STEERING GEAR
Filed Nov. 22, 1921
1,534,791
6 Sheets-Sheet 5
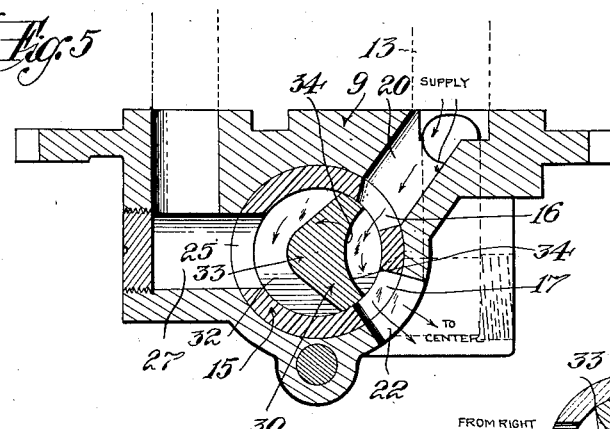
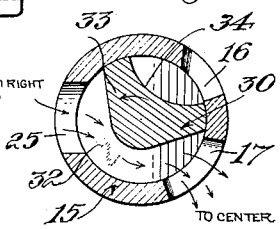
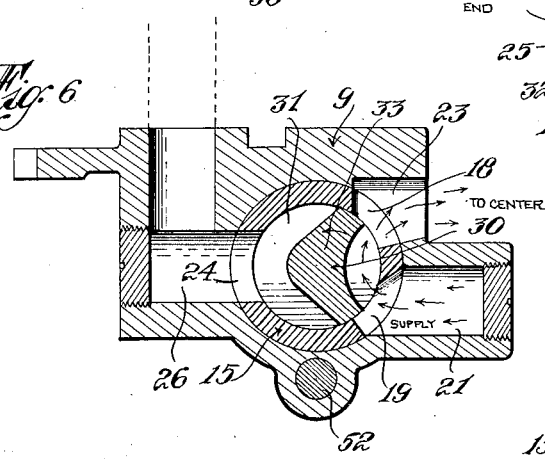
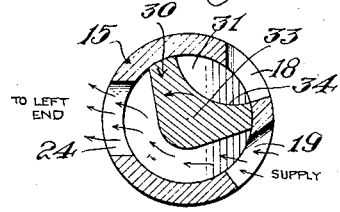
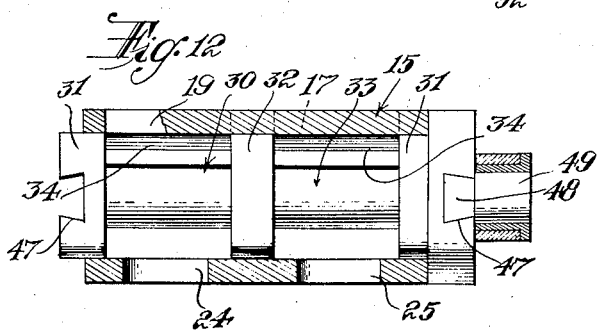
INVENTOR
Hans Kundig
BY C. P. Goepel
ATTORNEY April 21, 1925.
H. KUNDIG
HYDRAULIC STEERING GEAR
Filed Nov. 22, 1921
1,534,791
6 Sheets-Sheet 6
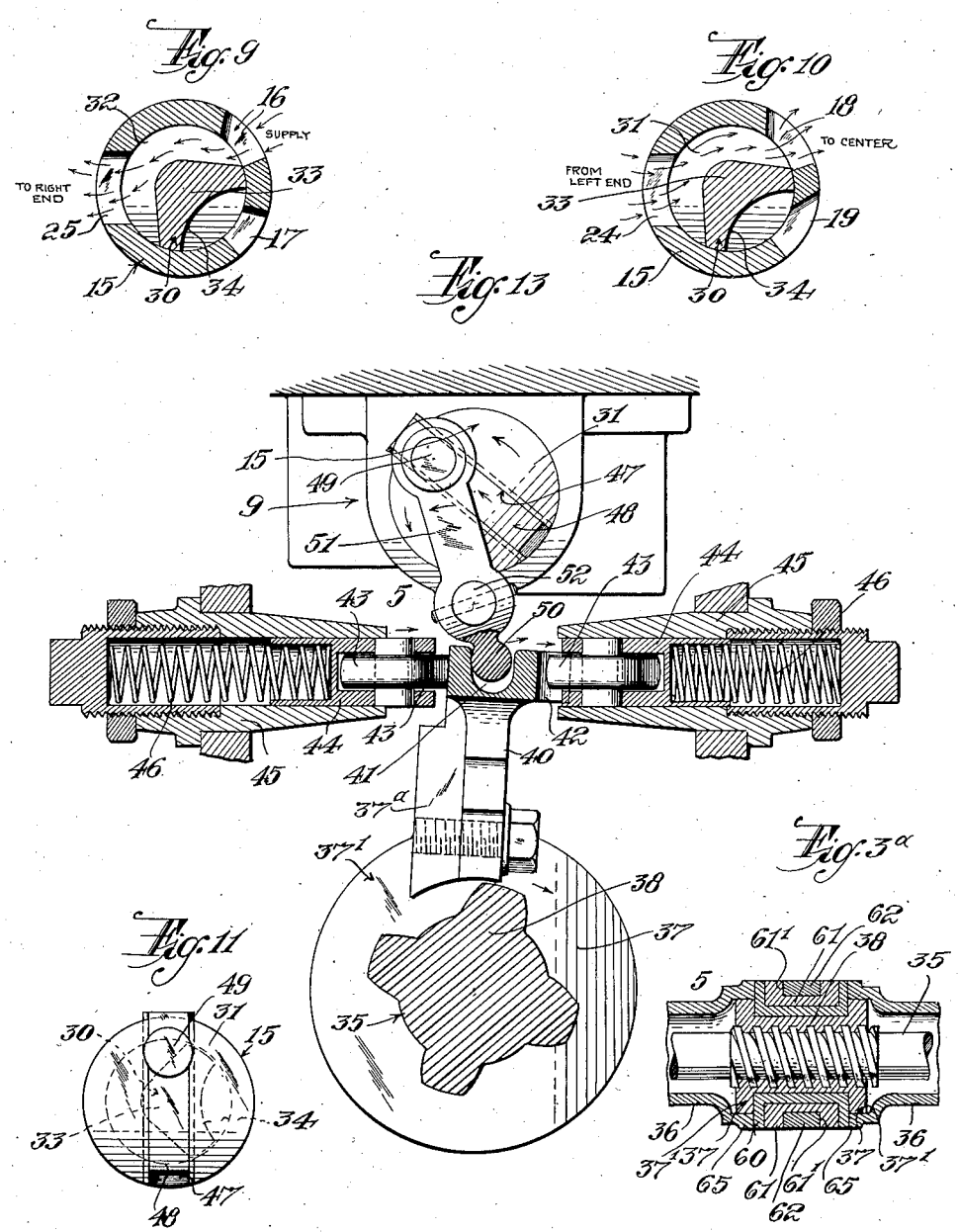

Patented Apr. 21, 1925.

1,534,791

UNITED STATES PATENT OFFICE.

HANS KUNDIG, OF NEW YORK, N. Y.

HYDRAULIC STEERING GEAR.

Application filed November 22, 1921. Serial No. 517,090.

*To all whom it may concern:*

Be it known that I, HANS KUNDIG, a citizen of Switzerland, and resident of New York city, borough of Manhattan, county and State of New York, have invented certain new and useful Improvements in Hydraulic Steering Gears, of which the following is a specification.

This invention relates to a hydraulic steering gear and has for its primary object to provide an improved hydraulic steering gear for motor vehicles which may be very easily operated and controlled and is positive and reliable in its action.

It is another object of the invention to provide a continuous circulation of the hydraulic medium in a steering gear of the above character and an improved valve and actuating means therefor controlling the flow of said medium whereby the primary steering shaft will be properly operated.

In one embodiment of the invention I provide a chamber normally in open communication with the tank or reservoir containing oil or other hydraulic medium which is constantly circulated under pressure and a piston receiving chamber at each side of said main chamber. A manually operable actuating shaft extends through these chambers and connected pistons loosely engaged thereon operate in each of the latter chambers. The shaft is operatively connected with the main steering rod or shaft by means of a nut connected to said pistons and with which a worm fixed on said shaft is engaged. This nut in turn actuates a valve controlling the admission of the pressure fluid from the supply source to the piston chambers whereby the pistons are shifted to actuate the steering shaft.

It is another important object of the invention to provide simple and effective means for automatically actuating the control valve independently of said worm to reverse the flow of the hydraulic medium to the piston cylinders and thereby return the pistons and consequently the steering wheels to neutral position.

With the above and other objects in view, the invention consists in the improved hydraulic steering gear and in the form, construction and relative arrangement of its several parts as will be hereinafter more fully described, illustrated in the accompanying drawings and subsequently incorporated in the subjoined claims.

In the drawings wherein I have shown one practical and satisfactory embodiment of the invention and in which similar reference characters designate corresponding parts throughout the several views:

Figure 1 is an elevation partly in section illustrating more particularly the circulatory system for the hydraulic medium;

Figure 2 is a vertical longitudinal section;

Figure 3 is a plan view partly in horizontal section;

Figure 3$^a$ is a horizontal section taken on the line 3$^a$—3$^a$ of Figure 2;

Figure 4 is a vertical section taken on the line 4—4 of Figure 3;

Figures 5 and 6 are enlarged sectional views of the control valve showing the same in its normal position connecting the main chamber with the supply tank or reservoir for the hydraulic medium;

Figures 7 and 8 are similar views showing the valve after it has been operated in one direction to connect one of the piston chambers with the supply pipe for the pressure fluid and the other piston chamber with the central chamber of the apparatus;

Figures 9 and 10 are sectional views of the valve showing the same turned in the opposite direction from that illustrated in Figures 7 and 8;

Figure 11 is an end elevation of the valve member when in normal position showing the relation of the operating slide;

Figure 12 is a longitudinal section of the valve;

Figure 13 is an enlarged sectional view showing the means for controlling the operation of the valve;

Figure 14 is a plan view of parts of the valve control means; and,

Figure 15 is a detail view illustrating a slightly modified form of the means for limiting the turning movement of the valve.

My improved apparatus as illustrated in the accompanying drawings includes a main chamber 5 and piston chambers or cylinders 6 extending from opposite sides of said main chamber and in communication therewith. The outer ends of these piston chambers are securely closed by means of suitable heads 7 and the upper end of the main chamber 5 is also closed by means of the head 8. This latter head carries a ported valve casing generally indicated at 9 which will be more particularly referred to in the following description.

A suitable oil or other hydraulic medium is normally forced under pressure in continuous circulation through the main chamber 5 and the tank or reservoir 10. A pipe 11 connects one end of this tank to a constantly operating pump 12, the opposite side of the pump casing being connected by the pipe or conduit 13 to the valve casing 9 through which the oil is admitted in the normal position of the valve into the chamber 5. The lower side of said chamber is connected to the oil tank 10 by means of the return pipe 14.

In the valve casing 9 a longitudinally extending sleeve or bushing 15 is fixed, said sleeve having two pairs of circumferentially spaced openings 16, 17 and 18, 19 in one side thereof. The openings 16 and 19 are in communication through the ports 20 and 21 with the supply pipe 13 while the openings 17 and 18 communicate through the ports 22 and 23 respectively in the casing wall with the chamber 5.

The opposite side of the valve bushing 15 is provided with longitudinally aligned openings 24 and 25 which register respectively with ports 26 and 27 in the valve casing. These latter ports are connected by means of pipes 28 and 29 to the respective piston cylinders 6.

Communication between the oil circulating pipes 13, 28 and 29, the chamber 5 and cylinders 6 is controlled by means of an oscillating valve 30 mounted in the sleeve or bushing 15, said valve having end heads 31 and an intermediate head 32 snugly fitting the inner wall of the bushing, said heads being connected to each other by the valve body 33, which, as clearly shown in Figures 5 to 10 inclusive, is of general V-shaped form in cross section. Thus there is provided at one side of the valve body and between the heads 31 and 32 thereof, the channels 34 which, in the normal position of the valve, seen in Figures 5 and 6, constitute connecting passages between the supply ports 20 and 21 and the ports 22 and 23 which open into the chamber 5.

The valve is actuated to control the flow of the pressure fluid by means of a shaft 35 which extends axially through the chamber 5 and the cylinder 6 and has suitable fluid-tight bearings in the head 7. Pistons 36 loosely surround this actuating shaft and have free reciprocation in the respective cylinders 6. These pistons are rigidly connected to each other by means of a nut 37 with which a worm 38 on the shaft 35 is operatively engaged. The nut 37 is operatively connected to the main steering shaft 39 as shown in Figures 2 and 4 of the drawing. Thus, the nut is rotatably mounted in a frame 60 which is preferably constructed in two similar sections bolted together and secured between heads 65 formed on the opposed ends of the pistons 36. The nut 37 is provided at its opposite ends with flanges 37' which are rotatably confined in channels or grooves formed in the heads 65. The frame 60 is provided in its opposite sides with circular recesses to receive the rotatable guides 61, said guides having channels 61' in which the upper ends of spaced arms 62 formed at the opposite ends of an enlargement 63 on the steering shaft 39, are slidingly engaged. The sides of the frame 60 below the guides 61 are recessed as at 66 to accommodate the lower portions of the arms 62 when said arms assume various angular position with respect to the frame.

The portion 63 of the steering shaft 39 is provided in its upper side with a transversely extending inverted V-shaped groove 67 in which a key-bar 68 secured to the lower side of the frame 60 is engaged. As the base wall of the groove 67 is downwardly inclined at opposite sides of its center the free oscillating movement of the steering shaft 39 is permitted while said shaft and the frame are held against a relative longitudinal shifting movement.

At its upper end the frame 60 is provided with adjustable stops 64 at opposite sides of the bar 40 which limit the angular movement of said bar and determine the extent of oscillation of the valve 30. Any approved operating connections may be provided between the shaft 39 and the knuckles of the vehicle wheels.

The flanges 37' of the nut 37 are provided with upwardly extending arms 37ª to which the bar 40 is fixed. This bar in its upper surface is provided with a longitudinal groove or channel 41. Each side face of the bar 40 intermediate of its ends is formed with an abutment cam 42 with which rollers 43 mounted in the plungers 44 coact. These plungers 44 are yieldingly movable in guides 45 which are mounted in the opposite side walls of the chamber 5. Springs 46 arranged in said guides coact with the respective plungers to yieldingly hold the rollers 43 in bearing contact against the side faces of the bar 40.

Each of the end heads 31 of the fluid control valve is provided in its outer face with a diametrically extending groove 47 having undercut or dove-tail side walls. In this groove a slide member 48 is engaged. A wrist pin 49 is fixed to said slide member adjacent one of its ends. A cylindrical rod 50 is loosely engaged in the channel 41 of the bar 40 and is provided upon each of its ends with an arm 51. Adjacent the rod 40 these arms are fixed to the opposite ends of a rod 52 journalled in a suitable bearing on the lower side of the valve casing 9 while the upper ends of said arms are loosely connected to the wrist pins 49 of the respective slide members 48.

Normally, the valve 30 closes communication between the outer ends of the piston cylinder 6 and the supply pipe 13 and the main chamber 5 so that the hydraulic fluid is circulated by the continuously operating pump 12 from the supply tank 10 through pipe 13, the chamber 5 and the pipe 14 back to the supply tank. The valve is in the position seen in Figures 5 and 6 so that the connection between the supply pipe 13 and the pipes 28 and 29 is cut off and there is open communication between said supply pipe and the chamber 5.

When it is desired to turn the machine in one direction the shaft 35 is rotated in the proper direction through the medium of suitable operating connections between said shaft and the steering rod or post to be later referred to. Thus, if the shaft 35 is rotated in the direction indicated by the arrow in Figure 1 of the drawings, the nut 37 rotates as a unit with the worm 38 owing to the fact that the connected pistons are held against longitudinal movement by the non-compressible fluid bodies in the respective cylinders and the nut is likewise held against longitudinal movement relative to said pistons. In other words, the bar 40 is moved to one side of its central perpendicular position and to an angular position as shown in Figure 13, thus forcing one of the rollers 43 and its plunger 44 into the guide 45 against the action of spring 46. In this movement of the bar 40 the valve 30 is oscillated through the medium of the rod 50 and the connections 51 between said rod and the valve. The valve is thus moved to the position seen in Figures 7 and 8 of the drawings wherein communication between the supply pipe and the chamber 5 is cut off and communication between the supply port 21 and the piston cylinder 6 at the left in Figure 1 is established on one side of the intermediate head 32 of the valve. At the other side of said head communication is simultaneously established between the right hand cylinder 6 and the chamber 5. Thus, as shown by the arrows in Figure 1, the oil or other fluid under pressure flows from the supply pipe 13 through the valve and the pipe 28 into the left hand cylinder 6 back of the piston therein and forces said piston together with nut 37 and the other piston towards the right, the fluid in the other chamber 6 passing through pipe 29 into the chamber 5 and hence through the return pipe 14 back to the supply tank 10. It will be understood that this action is instantaneous. The normal positions of the rollers 43 with respect to the cam abutments 42 on the bar 40 is illustrated in full lines in Figure 14 of the drawings. When the pistons together with said bar are moved longitudinally under the pressure influence of the hydraulic medium, one of said rollers rides upon the cam face of one of the abutments 42 and is moved to the position shown in dotted lines in Figure 14 thereby placing the spring 46 under compression. In this movement of the pistons, the nut 37 is rotated in a counter clock-wise direction, the reverse of the direction indicated by the arrow in Figure 13, owing to the longitudinal movement of the nut with the piston upon the worm 38. It will thus be apparent that the movement of the connected pistons and the return movement of the nut towards its normal neutral position in which the valve 30 is closed takes place concurrently. As long as the steering wheel is held stationary the valve will be retained in its closed position and the vehicle will therefore travel in a circular path, the pistons being held against further shifting by the non-compressible fluid bodies in the cylinders 6. After the pressure fluid admitted to the piston cylinder has expended its force, one of the rollers 43 being disposed upon the cam portion of the bar 40 at one side thereof, its spring 46 exerts a greater pressure than the spring of the other roller 43 so that the nut 37 and the worm 38 turn together as a unit, the bar 40 being moved beyond its normal perpendicular position. The valve 30 is thus oscillated in the opposite direction from its neutral position so that the other of the piston cylinders is connected to the supply pipe 13 and the cylinder which was formerly connected to said pipe is in communication with the chamber 5. It will be understood that in this continued movement of the bar 40 to the opposite side of its neutral position, the steering wheel has been released by the operator so that the worm 38 moves as a unit with the nut while the pistons remain stationary. In this manner the movement of the pistons in the respective cylinders will be reversed until the bar 40 again arrives at its neutral position and the valve 30 is returned to its normal position connecting the supply pipe 13 with the chamber 5. It will, therefore, be seen that while the valve is operated in one direction by the manual rotation of the worm 38 to operate the steering gear and move the vehicle wheels to their angular positions, the said valve is automatically actuated to control the flow of the hydraulic medium and effect the return of the steering wheels to a neutral position.

Upon a reversal of the turning movement of the steering post or shaft, the rotation of the actuating shaft is also reversed so that the bar 40 is moved to the opposite side of its normal perpendicular position from the position shown in Fig. 13 of the drawings, thereby oscillating the valve in the reverse direction and positioning said valve as shown in Figs. 9 and 10 of the drawings so that the pressure fluid behind the piston in the left hand cylinder shown in Fig. 1, will be released and will flow backwardly through the pipe 28 into the main chamber 5 while the pressure fluid from the supply pipe 13 passes through the pipe 29 into the right hand cylinder. The movement of the steering shaft 39 is thus reversed to reverse the direction of angular movement of the vehicle wheels from that first referred to. The steering wheels are of course returned to neutral position by the automatic actuation of the valve when the steering wheel is released, as above described.

By the provision of the adjustable stops 64, any desired extent of opening movements of the control valve may be secured so as to regulate the flow of the hydraulic medium into the piston cylinders. However, if desired, I may use the fixed stop pins 64' as shown in Fig. 16 of the drawings.

The pipe 11 is connected to the pipe 13 by means of a by-pass pipe 70, communication between said pipe 70 and the pipe 13 being normally closed by a valve 71. When the machine is not being operated and the pump 12 is not active, upon the operation of the pistons 36, the valve 71 is opened by suction and the fluid is drawn from pipe 11 through the pipe 70 and into the pipe 13. Thus it will be apparent that should the pump 12 at any time fail, the steering mechanism may nevertheless be operated by hand in the usual manner. I also provide a second pipe connection 72 between the pipe 13 and the return pipe connection 14 for relieving back pressure from the piston chambers 6 in case the pump 12 is operated at too great a speed. Communication between the pipes 72 and 13 is normally closed by the spring held valve 73.

I have above described one specific means for actuating the steering shaft in the movement of the pistons, but it will be obvious that by resorting to certain minor structural changes, in lieu of the worm and nut herein referred to, various other types of gearing might be utilized for translating a reciprocating movement of the piston into a rotary movement of the steering shaft. It will further be understood that the apparatus can be mounted and arranged in any desired position so that the manually operable shaft 35 will extend upwardly at a desired angle. On the other hand, however, in some cases, it may be found desirable to provide a separate steering post with suitable operating connections between the lower end of the post and the shaft 35.

From the foregoing description considered in connection with the accompanying drawings, the construction, manner of operation and several advantages of the invention will be clearly understood. It will be seen that I have produced a relatively simple hydraulic steering gear for vehicles in which the hydraulic fluid medium under pressure is supplied to one of the piston cylinders and expelled from the other during the continuous turning movement of the main steering rod or post. The several parts of the mechanism are compact in their arrangement, positive and reliable in the performance of their functions and not liable to get out of order. Likewise, the several parts of the mechanism which I have above described in detail might be variously modified and the mechanism exemplified by numerous other alternative constructions. Accordingly, the privilege is reserved of adopting all such legitimate changes as may be fairly embodied within the spirit and scope of the invention as claimed.

It will be seen that in the use of the present invention the steering gear is irreversible, that is, it does not give or yield due to any shocks occasioned by the wheels striking against obstructions so that such shocks are not transmitted through the steering gear to the hand wheel. It will also be observed that the path of angular movement of the hand wheel can be as great or small as desired without variation in the energy required for the turning of the hand wheel. This is due to the fact that the operation of the hand wheel determines only the direction in which the vehicle is steered while the actual operation of the steering gear is performed through the medium of the valve controlling the pressure influence of the hydraulic medium upon the pistons, such hydraulic medium being non-compressible and therefore, effectually preventing the transmission of retroactive forces to the hand wheel.

I claim:

1. In a hydraulic steering gear, means for maintaining a continuous circulation of the fluid medium, means operable under the influence of the fluid medium to actuate the steering shaft, and means controlling the circulation of said fluid medium and operatively connected with said actuating means to automatically govern the duration of effective influence of the fluid medium upon the latter.

2. In a hydraulic steering gear, means for maintaining a continuous circulation of the fluid medium, means operable under the influence of the fluid medium to actuate the steering shaft, means controlling the circulation of said fluid medium and operatively connected with said actuating means to automatically govern the duration of effective influence of the fluid medium upon the latter and means for operating said fluid control means independently of said actuating means to reverse the direction of movement of the steering shaft and return the same to neutral position.

3. In a hydraulic steering gear, means for maintaining a continuous circulation of the fluid medium, a piston reciprocable under the influence of the hydraulic medium, means operatively connecting said piston to the steering shaft, and means controlling the circulation of said fluid medium connected to and actuated by said last named means to automatically govern the duration of effective influence of the fluid medium upon the piston.

4. In a hydraulic steering gear, means for maintaining a continuous circulation of the fluid medium, a piston reciprocable under the influence of the hydraulic medium, means operatively connecting said piston to the steering shaft, means controlling the circulation of said fluid medium connected to and actuated by said last named means to automatically govern the duration of effective influence of the fluid medium under the piston, and means for automatically actuating said fluid control means independently of the operating connection between the piston and the steering shaft to reverse the direction of movement of said piston and return the steering shaft to neutral position.

5. In a hydraulic steering gear, means for maintaining a continuous circulation of the fluid medium, spaced cylinders and a piston reciprocating in each of said cylinders, means common to both of said pistons operatively connecting the same to the steering shaft, and means controlling the circulation of said fluid medium to admit said medium to either of the piston cylinders whereby the steering shaft is rotated in the desired direction and having an operative connection with the operating means connecting the pistons to the steering shaft to automatically cut off communication between the piston cylinders and the course of circulation of the hydraulic fluid medium.

6. In a hydraulic steering gear, means for maintaining a continuous circulation of the fluid medium, spaced cylinders and a piston reciprocating in each of said cylinders, means common to both of said pistons operatively connecting the same to the steering shaft, means controlling the circulation of said fluid medium to admit said medium to either of the piston cylinders whereby the steering shaft is rotated in the desired direction and having an operative connection with the operating means connecting the pistons to the steering shaft to automatically cut off communication between the piston cylinders and the course of circulation of the hydraulic fluid medium, and means for operating said fluid control means independently of the operating connection between the pistons and the steering shaft to reverse the direction of movement of said pistons and return the steering shaft to neutral position.

7. In a hydraulic steering gear, spaced pistons connected to each other for operation as a unit, a valve governing the pressure influence of the medium against said pistons, means for operating said valve including an actuating member, means automatically operated by the movement of said pistons under the influence of the fluid medium to return said valve to its normal position and thereby cut off the supply of the fluid medium, and means for actuating said last named means independently of the pistons to reverse the direction of movement of said pistons and return the steering shaft to neutral position.

8. In a hydraulic steering gear, a fluid circulation chamber and piston cylinders at opposite sides of said chamber, means for normally maintaining a constant circulation of the fluid medium through said chamber, pistons in the respective cylinders, means operatively connecting said pistons to the steering shaft, a valve controlling the course of circulation of the fluid medium, semi-automatic actuating means for said valve, said means adapted to be manually operated to divert the normal course of circulation of the fluid medium and cut off the supply connection with said chamber and establish connection between the supply and one of the cylinders and simultaneously open connection between the other of the cylinders and said chamber whereby the pistons are moved in one direction to actuate the steering shaft, said valve actuating means being automatically operated by the movement of the pistons to return the valve to its normal position and cut off the connections with the piston cylinders and again establish the normal circulation flow between the supply source and said chamber, and additional means coacting with said valve actuating means to automatically continue the movement of the valve beyond its normal position and reverse the connection between the piston cylinders, the supply source and said chamber to return the pistons and the steering shaft to neutral position.

9. In combination, a reciprocating piston, a valve controlling the supply of pressure fluid for actuation of said piston, manually operable means to open said valve including a worm and a nut threaded thereon, and means connecting said nut to the piston for movement therewith relative to the worm by the movement of the piston under the influence of the pressure fluid to thereby close the valve.

10. In combination, a reciprocating piston, an oscillatable valve controlling the supply of pressure fluid for the actuation of said piston, means for manually operating said valve to open the supply connection, said means including a manually operable part, a member actuated thereby, means operatively connecting said member to the valve, and means connecting said member to the piston for movement therewith by the reciprocation of the piston under the pressure influence of the fluid to move said member relative to the manually operable part and return the valve to its closed position.

11. In combination, a reciprocating piston, an oscillating valve controlling the supply of pressure fluid for the actuation of said piston, means for operating said valve to open the pressure fluid supply connection, said means including a manually operable worm, a nut threaded thereon and rotatable as a unit with the worm in one direction, means operatively connecting said nut to the valve, and means connecting said nut to the piston for movement as a unit with the latter relative to the worm by the reciprocating movement of the piston under the pressure influence of the fluid whereby said nut is rotated in a reverse direction to close the valve.

12. In combination, a reciprocating piston, an oscillating valve controlling the supply of pressure fluid for the actuation of said piston, means for operating said valve to open the pressure fluid supply connection, said means including a manually operable worm, a nut threaded thereon and rotatable as a unit with the worm in one direction, means operatively connecting said nut to the valve, means connecting said nut to the piston for movement as a unit with the latter relative to the worm by the reciprocating movement of the piston under the pressure influence of the fluid whereby said nut is rotated in a reverse direction to close the valve, and yieldable means coacting with the operating connection between the nut and said valve to automatically continue the reverse oscillation of the valve beyond its neutral position and thereby reverse the direction of movement of said piston.

13. In a hydraulic steering gear, means for maintaining a continuous circulation of the fluid medium, means operable under the influence of the fluid medium to actuate the steering shaft, and semi-automatic means controlling the circulation of said fluid medium and operatively connected to said actuating means to rotate the steering shaft in either direction and to return said shaft to a neutral position.

14. In a hydraulic steering gear, spaced pistons connected to each other for operation as a unit, a valve governing the pressure influence of the medium against said pistons, means manually operable to move the valve in either direction from a neutral position and admit the fluid medium to one of the piston cylinders, said means including a part automatically actuated by the movement of the pistons to return the valve to its neutral position, and additional means automatically coacting with said valve actuating means to continue the movement of the valve beyond its neutral position and thereby admit the fluid medium to the other of the cylinders to reverse the movement of the pistons and return said pistons to a neutral position.

In testimony that I claim the foregoing as my invention, and I have signed my name hereunder.

HANS KUNDIG.